United States Patent [19]

McClanahan et al.

[11] Patent Number: 5,422,550
[45] Date of Patent: Jun. 6, 1995

[54] CONTROL OF MULTIPLE MOTORS, INCLUDING MOTORIZED PUMPING SYSTEM AND METHOD

[75] Inventors: Michael L. McClanahan, Moore; Charles E. Ogden, Oklahoma City, both of Okla.

[73] Assignee: Southwest Electric Company, Oklahoma City, Okla.

[21] Appl. No.: 70,106

[22] Filed: May 27, 1993

[51] Int. Cl.⁶ .............................. G05B 11/12
[52] U.S. Cl. ..................... 318/91; 318/103; 318/68; 318/447; 318/445; 60/420
[58] Field of Search ............ 318/34, 44, 39, 41, 318/49, 50, 51, 53, 59, 62, 64, 66, 67, 69, 68, 77, 78, 91, 98, 101, 102, 103, 104, 447, 474, 445; 361/28, 24, 31; 60/420, 424, 426, 421

[56] References Cited

U.S. PATENT DOCUMENTS

| | | | |
|---|---|---|---|
| 1,894,928 | 1/1933 | Wesche . | |
| 1,910,202 | 5/1933 | Crago . | |
| 2,326,804 | 8/1943 | Sigmund et al. | 103/11 |
| 2,707,260 | 4/1955 | Rhyne, Jr. et al. | 318/229 |
| 2,789,264 | 4/1957 | Lannefors | 318/229 |
| 2,798,193 | 7/1957 | Behr | 318/229 |
| 3,387,197 | 6/1968 | Paulus | 318/229 |
| 3,393,642 | 7/1968 | Kordik et al. | 103/35 |
| 3,551,072 | 12/1970 | Zimmerly | 417/45 |
| 3,624,471 | 11/1971 | Japp et al. | 318/225 R |
| 4,002,027 | 1/1977 | Eley et al. | 60/426 |
| 4,021,700 | 5/1977 | Ellis-Anwyl | 318/447 |
| 4,270,072 | 5/1981 | Weber | 318/51 |
| 4,354,420 | 10/1982 | Bianchetta | 60/426 |
| 4,565,953 | 1/1986 | Espelage et al. | 318/345 E |
| 4,712,054 | 12/1987 | Boldt | 318/758 |
| 4,713,744 | 12/1987 | Coston | 363/160 |
| 4,761,726 | 8/1988 | Brown | 363/51 |
| 4,931,715 | 6/1990 | Lee et al. | 318/709 |
| 4,948,209 | 8/1990 | Baker et al. | 322/10 |
| 5,055,762 | 10/1991 | Disser et al. | 318/811 |
| 5,087,864 | 2/1992 | Abel | 318/66 |
| 5,130,628 | 7/1992 | Owen | 318/789 |
| 5,237,250 | 8/1993 | Zeile et al. | 318/67 |
| 5,248,922 | 9/1993 | Meshkat | 318/62 |

OTHER PUBLICATIONS

City of Norman (Oklahoma) Invitation to Bid #9293-23 with Specifications, dated Jul. 16, 1992 but previously released for bids before Apr. 1992 (7 pages).

Primary Examiner—John W. Cabeca
Attorney, Agent, or Firm—Dougherty, Hessin, Beavers & Gilbert

[57] ABSTRACT

A control system and method for a plurality of motors utilize one, and only one, motor drive unit that provides power to drive any one of the motors. The system and method also utilize a controller that controls which of the motors to energize. Power from the motor drive unit can be communicated to one of the motors selected by the controller, or power from a primary power source can be communicated to one or more of the motors selected by the controller. Sequencing of the motors to and from the motor drive unit and the primary power source, and between the two, is automatically controlled, such as based on how long each of the motors has been used. Accordingly, a method of controlling a plurality of motors comprises: defining a motor utilization criterion; sensing a parameter affected by the number of the motors that are operating; and sequentially starting and cumulatively operating ones of the motors selected in response to the motor utilization criterion and the sensed parameter.

32 Claims, 4 Drawing Sheets

CONTROL OF MULTIPLE MOTORS, INCLUDING MOTORIZED PUMPING SYSTEM AND METHOD

BACKGROUND OF THE INVENTION

This invention relates generally to a control system and method for a plurality of motors and more particularly, but not by way of limitation, to a pumping system and method wherein a plurality of motors are controlled to operate connected pumps that communicate with a reservoir of fluid.

An electric motor used to drive a device at a variable speed can be energized by a motor drive unit that converts the electrical power signal from a primary power source to a suitable level or frequency by which the speed of the motor, and thus of the driven device, is varied. When a maximum speed is reached, or when there is a problem with the motor drive unit, the motor may be switched directly to the primary power source, which typically is intended to provide a constant voltage and frequency. An example of a primary power source is an alternating current power network of an electric utility. "Directly" is used above to distinguish from the connection of the motor to a motor drive unit, but a "direct" connection as used herein can include other types of intervening devices, such as step-up and step-down transformers, fuses, circuit breakers, etc.

The motor drive unit referred to above is of the type that is used with a single motor; therefore, when several motors are needed, a like number of motor drive units are used. To reduce the expense of having a respective motor drive unit for each motor, there is the need for a system and method by which only one motor drive unit need be used with several motors. Despite having only one motor drive unit, such a system and method should be able to operate even if the one motor drive unit fails. Furthermore, it would be desirable for such a system and method to be able to switch motors to and from the motor drive unit without first stopping the motors to reduce the effects of sudden changes on the motors, devices driven by the motors and the systems in which they are used.

Such a system and method would be useful in many applications, a specific one of which is for driving pumps at a wastewater treatment plant. Sewage treatment is susceptible to "shock loads" which occur if the incoming flow rate varies over wide ranges; however, a treatment plant operates more efficiently if a smooth input flow rate is provided. Although a completely stable or constant flow rate cannot always be provided, one that is less susceptible to large fluctuations or shock loads can be provided from a variable motor-driven pumping system that tries to maintain a constant level of fluid in the wells or reservoirs accumulating the incoming flows prior to the accumulated wastewater entering the treatment process.

As another example, a system and method using a single motor drive unit would also be useful for driving fans on cooling towers or fans on large air conditioning systems where variable speed fan operation has been desired but has not been economically feasible because one variable speed drive unit would have been used for each fan motor. For example, putting enough individual variable speed motor drive units to control a 22-fan cooling tower of which we are aware could cost approximately $500,000.

Still other applications include, for example, any multiple motor driven centrifigal load devices such as centrifugal compressors, gear boxes, blowers, fans, pumps, etc. that can be direct coupled or belt driven, for example.

In the above example of a pumping system at a wastewater treatment plant, the flow of fluid into the reservoir is variable; therefore, the pumping system needs to provide for variable speed pumping, which requires variable speed motors such as the aforementioned type that are operated through motor drive units. Furthermore, the fluid reservoir is large enough that several pumps are sometimes needed; therefore, the pumping system preferably should keep track of the usage of the pumps and rotate them in variable utilization cycles to even out their time of operation.

Because motors within a single system, and the pumps driven by the motors in our specific example of a wastewater treatment plant, can have different characteristics, it also would be desirable to be able to control the motors (and thus their driven devices) in response to one or more such characteristics. For example, it would be desirable to operate a system of motor-driven pumps in response to the individual power curves of each pump because this would enable more efficient use of the electrical power needed to operate the system.

It would also be desirable for such a method and system as generally referred to above to have the capability of providing a less expensive form of electrical and/or hydraulic surge control when starting and stopping large pumps. To prevent hydraulic "hammering", for example, existing techniques use large, expensive surge control valves (e.g., a 450 horsepower pump surge valve can cost approximately $14,000 and weigh approximately 2,500 pounds).

Thus, there is the general need for a system and method by which only one motor drive unit need be used with several motors, and there are the additional needs within such system and method as exemplified above.

SUMMARY OF THE INVENTION

The present invention overcomes the above-noted and other shortcomings of the prior art and meets the aforementioned and other needs by providing a novel and improved control system and method for a plurality of motors. The present invention has especially advantageous application in a pumping system and method.

Although the present invention has many advantages apparent by meeting the needs mentioned above, one of particular note is energy conservation. It has been known that energy can be more efficiently utilized, and thus energy resources conserved, by using continuously variable speed motor drive units to drive electric motors instead of using control devices that operate the motors less variably (e.g., only at half speed, full speed or off). Until the present invention, however, one such variable speed drive unit has been needed for each motor. In some cases this can be cost prohibitive because the payback period for the investment in multiple drive units is too long. Thus, less energy efficient control systems are retained.

Using the present invention which requires only a single motor drive unit, payback periods can be sufficiently reduced whereby more conversions to the more energy efficient motor drive devices can be made. For example, whereas a conventional variable speed control system for the aforementioned 22-fan cooling tower could cost approximately $500,000; the present invention can be used for about $50,000, a 90% cost saving and a significant reduction in the payback period. In a 4-pump system, for example, in the surge control application example given above, savings could be 70%-80% by using the present invention with a single soft-start type of motor control device instead of by using the conventional surge control valves referred to above. Thus, it is apparent that the more the system and method of the present invention are used, the less energy that is consumed relative to the replaced less energy efficient systems.

The present invention provides a control system for a plurality of motors, comprising: one, and only one, motor drive means for providing power to drive any one of the motors; control means for controlling which of the motors to energize; first means for communicating the power from the motor drive means to one of the motors selected by the control means; and second means, adapted for connecting to a primary power source, for communicating power from the primary power source to one or more of the motors selected by the control means.

More particularly, the present invention provides a control system for a plurality of motors, comprising: one variable speed drive for energizing a motor to run at different speeds; a programmed motor controller; a first plurality of switches, each of the first plurality of switches connected to the variable speed drive and to a respective motor; a second plurality of switches, each of the second plurality of switches connected to a primary power source and to a respective motor; and connecting means for connecting the programmed motor controller to the first and second pluralities of switches; wherein at any one time at most one of the first plurality of switches is operated in response to the programmed motor controller through the connecting means to operatively connect the variable speed drive to the respective motor and at any one time at most all of the second plurality of switches are operated in response to the programmed motor controller through the connecting means to operatively connect the primary power source to the respective motors.

A pumping system of the present invention comprises: a plurality of pumps; a plurality of pump motors, each of the motors connected to a respective one of the pumps; motor drive means for providing power to energize any one of the motors; control means for controlling which of the motors to energize; first means, responsive to the control means, for communicating the power from the motor drive means to one of the motors selected by the control means; and second means, adapted for connecting to a primary power source and responsive to the control means, for communicating power from the primary power source to one or more of the motors selected by the control means; wherein at any one time when pumping is to occur the first means is operated in response to the control means to operatively connect the motor drive means to at most one of the motors and at any one time the second means is operated in response to the control means: to operatively connect the primary power source to at most all the motors.

The present invention also provides a method of controlling a plurality of motors, comprising: determining when a first motor is to be started; energizing the first motor from a variable speed drive so that the speed of the first motor is increased to a predetermined speed; energizing the first motor from a primary power source instead of from the variable speed drive after the first motor is running at the predetermined speed; determining when a second motor is to be started; and energizing the second motor from the variable speed drive so that the speed of the second motor is increased while the first motor is energized from the primary power source.

The present invention also provides a method of controlling a plurality of motors, comprising: defining a motor utilization criterion; sensing a parameter affected by the number of the motors that are operating; and sequentially starting and cumulatively operating ones of the motors selected in response to the motor utilization criterion and the sensed parameter.

The present invention also provides a method of pumping fluid from a fluid reservoir using a plurality of pumps communicating with the fluid reservoir so that fluid in the reservoir can be pumped through each pump when such pump is operated, and further using a plurality of motors, each of such motors connected to drive a respective one of the pumps when the respective motor is energized. This method comprises: defining a desired condition of the fluid in the reservoir; sensing an actual condition of the fluid in the reservoir; energizing a first motor from a motor drive unit in response to the sensed actual condition exceeding the desired condition; subsequently energizing the first motor from a primary power source instead of from the motor drive unit; determining, in response to the actual condition still exceeding the desired condition, when a second motor is to be started; and energizing the second motor from the motor drive unit while the first motor is energized from the primary power source.

Therefore, from the foregoing, it is a general object of the present invention to provide a novel and improved control system and method for a plurality of motors, and more particularly, a novel and improved pumping system and method. Other and further objects, features and advantages of the present invention will be readily apparent to those skilled in the art when the following description of the preferred embodiments is read in conjunction with the accompanying drawings.

DETAILED DESCRIPTION OF PREFERRED EMBODIMENTS

Figure 1:
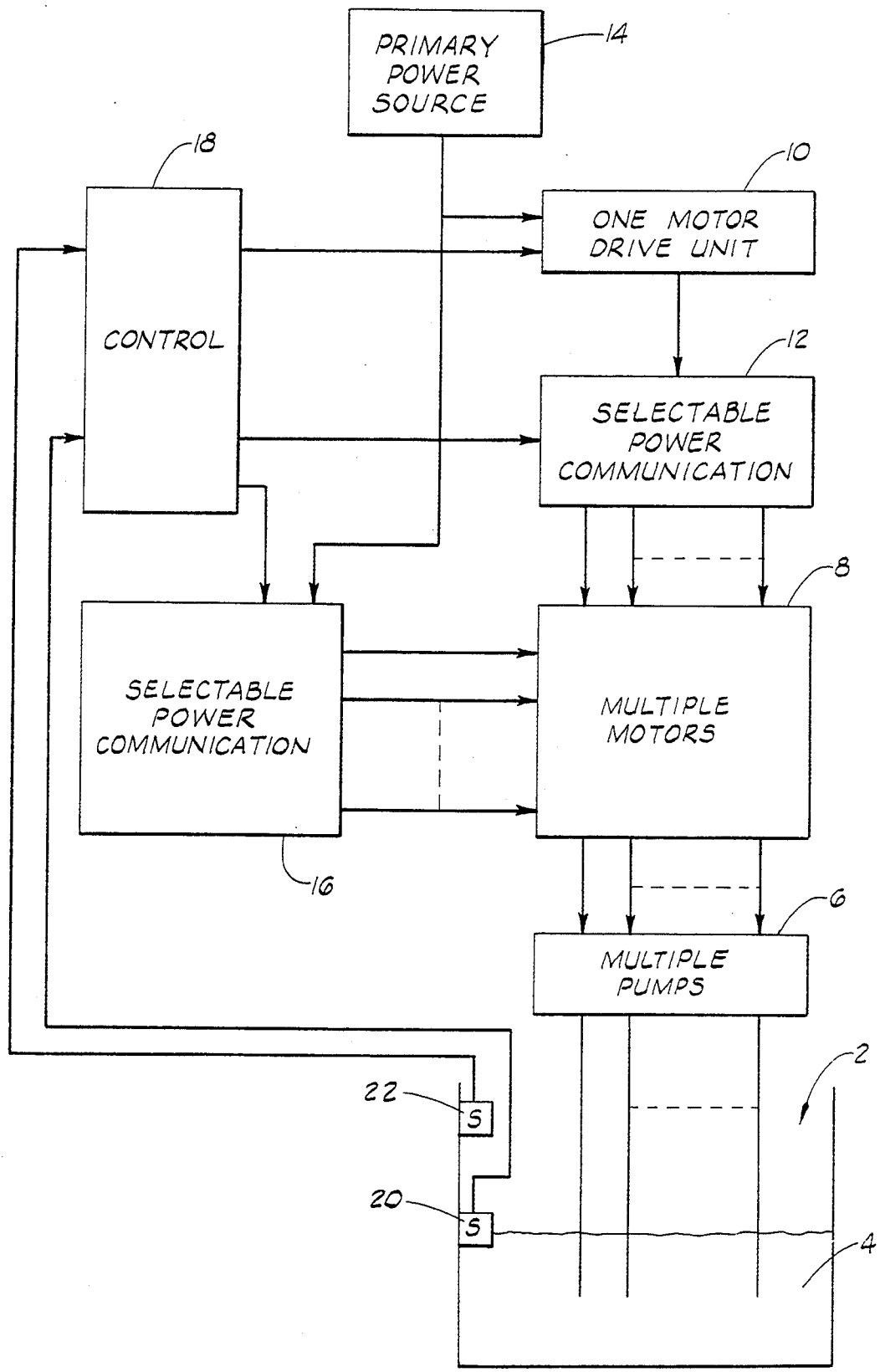
FIG. 1 is a block diagram of a motor control system of the present invention applied within a pumping system for maintaining a fluid in a reservoir at a desired level.

Referring to FIG. 1, a reservoir 2 contains a fluid 4. By way of specific example, the reservoir 2 includes one or more wells of a municipal wastewater system. The fluid 4, predominately water in our example, flows into the reservoir 2 at variable rates. As explained above, it is important to keep the fluid 4 at a relatively constant level; therefore, there is the need for multiple pumps 6 that communicate with the fluid 4 so that the pumps 6 can pump excess fluid from the reservoir 2 at a variable rate as needed to maintain the desired level.

Each of the pumps 6 is driven by a respective one of a plurality of motors 8. The pumps 6 and the motors 8 are coupled in a known manner so that as a motor is energized its rotor rotates and drives the connected pump.

The motors 8 are operated either by a single motor drive unit 10, as connected through first selectable power communication means 12, or directly from a primary power source 14 as connected through second selectable power communication means 16.

The motor drive unit 10, the first selectable power communication means 12 and the second selectable power communication means 16 are controlled by a control means 18 that is responsive to, among other conditions as desired, the level of the fluid 4 in the reservoir 2 as sensed by a primary or main level sensor 20 or by a back-up maximum level sensor 22.

In operation, one of the motors 8 is selected through the first selectable power communication means 12 to be started by the motor drive unit 10. The motor drive unit 10 is preferably used to vary the speed of the selected motor 8 up to a desired or maximum speed. When the selected motor 8 reaches such speed limit for which the motor drive unit 10 is used, the motor 8 is switched to the primary power source 14 through the second selectable power communication means 16. The motor drive unit 10 is disconnected from this motor 8 so that it can be switched to another motor 8. This operation is repeated as needed to drive enough of the pumps 6 to maintain the desired fluid level in the reservoir 2. When the demand defined by the level of the fluid 4 decreases below a preset point defining the desired level, the last activated motor 8 is switched back to the motor drive unit 10 where it resumes variable speed operation down to a stopped condition as necessary. As demand continues to fall, the motors 8 are sequentially removed from operation in this manner until no pumps are operating. This occurs in reverse sequential order from that in which the motors were initially energized.

The foregoing will be more particularly described with reference to FIGS. 2 and 3, wherein like elements are identified by the foregoing reference numerals.

Figure 2:
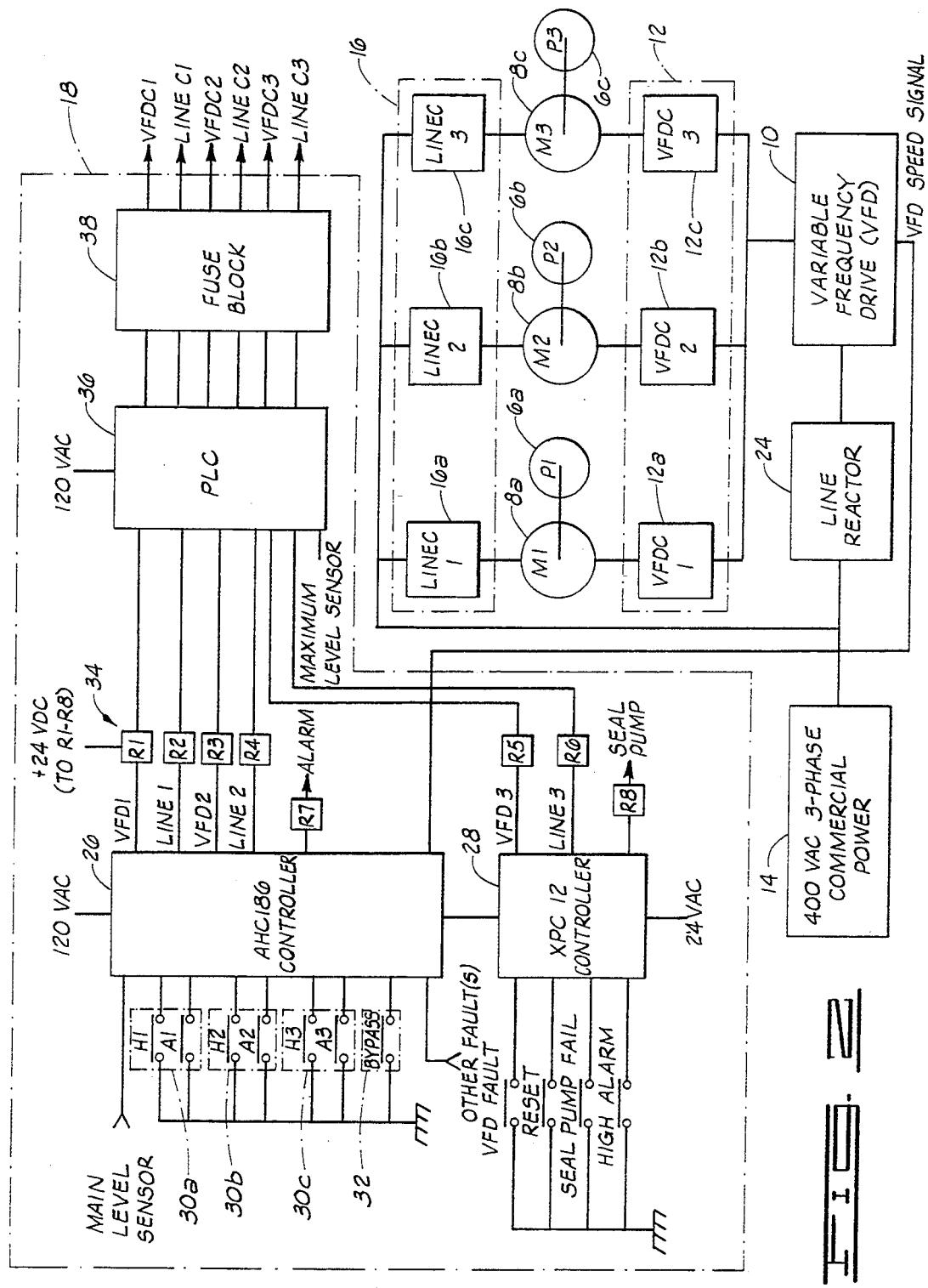
FIG. 2 is a schematic and block diagram of a particular implementation of the system represented in FIG. 1.

A particular implementation of the system illustrated in FIG. 1 is shown in FIG. 2. Three pumps 6a, 6b, 6c are shown connected to respective motors 8a, 8b, 8c. In a broader aspect of the invention, two or more motors can be used alone or with pumps or other devices driven by the motors.

Although not shown in FIG. 2, suitable overload sensing devices of types known in the art can be used with the pumps and/or motors to sense overload conditions and generate signals in response. Such signals can be provided to the control means 18 as will be described hereinbelow.

Examples of pumps 6 and motors 8 that can be used in a specific application of pumping wastewater from a municipal well system include: pumps from Peerless, Aurora, PACO and Johnson; and motors from Siemens, Toshiba and Century Magnetec.

In the FIG. 2 embodiment, the first selectable power communication means 12 includes three switches implemented by 3-phase contactors 12a, 12b, 12c. The second selectable power communication means 16 includes three switches implemented by 3-phase contactors 16a, 16b, 16c. Each of the contactors 12, 16 can be of a suitable type such as ones from Siemens, Toshiba and Square D.

When any one of the contactors 12a, 12b, 12c is closed, it connects the 3-phase output of a conventional variable frequency drive, such as a Toshiba VT130 G2 PLUS, implementing motor drive unit 10 (thus, each of the contactors can be referred to as a variable frequency drive contactor or "VFDC" as labeled in FIG. 2). In general, there is one VFDC 12 for each motor 8 in the system.

Although not shown in FIG. 2, the variable frequency drive unit 10 typically provides a fault signal if it malfunctions. This can be used by the control means 18 as subsequently described.

In normal operation, the variable frequency drive unit 10 converts the 3-phase power signal from the primary power source 14, communicated through a conventional protective line reactor 24 (e.g., a Toshiba 125 horsepower, three-phase, 150 ampere unit) in the embodiment of FIG. 2, into a desired variable frequency 3-phase electrical power signal. The conversion is done in response to a speed control signal of known type (given a specific implementation of variable frequency drive unit 10) input to the variable frequency drive unit 10. In the present invention, this control signal is generated by the control means 18.

It is to be noted that in other embodiments or applications of the present invention, the motor drive unit 10 need not necessarily be a variable speed drive such as the variable frequency drive unit 10 represented in FIG. 2. For example, the motor drive unit 10 can be implemented by a "soft start" device.

For the specific devices and application referred to herein, the primary power source 14 of FIG. 2 is shown as a 400 VAC 3-phase power source as obtained from a municipal utility (via suitable transformer conversion as needed), for example. Although this power signal can be converted by the variable frequency drive unit 10 to run a selected one of the motors 8 at a desired speed up to a maximum speed, the power signal of the primary power source 14 can be directly connected to one or more of the motors through the respective contactors 16 which can be referred to as line contactors ("LINEC" in FIG. 2). When a respective line contactor 16 is closed, the full 3-phase signal output from the source 14 is communicated to the respective motor.

From the foregoing, it is apparent in the preferred embodiment that there is one VFD switch 12 and one line switch 16 per motor 8. Each of these switches is opened and closed in response to electrical signals from the control means 18.

The control means 18 of the FIG. 2 embodiment includes any suitable type of control circuit, whether analog or digital, discrete or integrated, hard-wired or programmable. In the embodiment of FIG. 2, the control means 18 includes a Teletrol AHC186 controller 26 for the main computer. For a system with three or more pumps, XPC12 expansion modules 28 are used as slaves off the main controller 26. A maximum of five such modules 28 can be used in the embodiment represented in FIG. 2. Inputs into the devices 26, 28 represented in FIG. 2 can be 4–20 milliampere, 0–5 VDC, 0–12 VDC, 10K thermistors and switch contact inputs. Analog outputs are 4–20 milliampere (in either a current sink or current source mode) or 0–12 VDC. Relay outputs are rated for 30 VAC at 2 amperes.

The two controller devices 26, 28 are used together to provide enough input and output ports to accommodate the specific implementation of FIG. 2. In this implementation, four selector switches 30a, 30b, 30c, 32 are connected to input ports of the master controller 26, and three fault signals and a reset signal are provided to the slave controller 28. Other fault signals can be used, such as shown connected to the master controller 26 ("other faults"). The actual level indicating signal from the main level sensor 20 is also shown provided to the controller 26.

In response to these various inputs, controllers 26, 28 provide six output signals that control whether the contactors 12, 16 are open or closed. The controller 26 also provides the speed control signal to the variable frequency drive 10 and an alarm control signal that operates a horn, light or other type of alarm when a fault condition is detected. The slave controller 28 also provides a signal that activates a second seal pump (not shown) used to cool the seals of the pump 6. This occurs if a primary seal pump fails as detected through the "seal pump fail" signal indicated as an input to the slave controller 28 in FIG. 2.

When these output signals from the controllers 26, 28 are to cause the closure of a contactor 12, 16, sound the alarm, or activate the back-up seal pump, the respective signal closes a respective one of eight conventional relays 34 (e.g., Potter & Blumfield KCP24) so that a +24 VDC signal is applied as the actuating signal. In the case of sounding an alarm, the +24 VDC signal energizes a horn and/or turns on a light. In the case of the seal pump, the +24 VDC signal operates another relay (not shown) through which the back-up seal pump is energized. As to closing one or more of the contactors 12, 16, the +24 VDC signals are communicated through a Toshiba EX-14B programmable logic controller 36 that provides soft interlocking and contactor timing. The programmable logic controller 36 insures that in the event of a software conflict, a self-destructive mode cannot be entered by the system. In general, the controller 36 provides switching delay for the contractors 12, 16 to sequentially close. Hard interlocking is provided through auxiliary contacts on each contractor.

The programmable logic controller 36 also provides a second layer of back-up operation for fluid level control by receiving the signal from the maximum level sensor 22. In response to this signal indicating that the fluid level in the reservoir 2 is at a maximum allowable level, the programmable logic controller 36 itself automatically turns on all active motors by closing the respective line contactors 16. Whether all are used and how long they are used can be programmed as desired.

As shown in FIG. 2, respective output signals (VFDC1, LINEC1, etc.) are provided for each contactor 12, 16. These signals are in respective circuits, each having a respective fuse as indicated by conventional fuse block 38 (e.g., a Little Fuse 1 ampere, 125 volt slow blow fuse).

Referring to the inputs to the controllers 26, 28, the switches 30a, 30b, 30c provide means for independently selectably operating each of the motors in one of three modes. In one mode, referred to as the automatic or "auto" mode, a motor 8 so operated is normally initially energized through the VFD contactors 12 and subsequently through the LINE contractors 16. In another mode, referred to as the line or "hand" mode, a motor 8 so operated is normally initially energized only through the line contactors 16. In a further mode, referred to as the "off" mode, a motor 8 so selected is not operated. In either of the first two modes, a motor 8 so selected is referred to herein as an active motor. In the "off" mode, such a motor 8 is inactive. The switches 30 are implemented by conventional hand/off/auto (HOA) switches, such as Cutler Hammer 10250T4023.

Even though the AHC186 controller 26 has built-in HOA switches, it is recommended that these not be used to operate the system. To insure that the internal switches are not operated inadvertently, the alarm system will operate any time one of the internal HOA switches is not in the "auto" position. This alarm cannot be silenced or defeated in the particular implementation described herein.

In another implementation, at least the switches 30 can also be connected to the programmable logic controller module 36 so that these switches can be read by both the main controller 26 and the controller 36.

The switch 32 is a conventional switch such as a Cutler Hammer 10250T4011, which allows the operator to manually place the system in either a bypass mode or an inverter mode. In the bypass mode, as a motor 8 is called for by the controller 26, it will be started across the line through the respective contactor 12. In the inverter mode, each motor 8 is started through its respective contactor 12 with the variable speed drive unit 10 so that it at least initially operates in a variable speed mode.

Still referring to the inputs shown in FIG. 2, the "high alarm switch" senses the fluid level directly from a bubbler system, such as an ASCO tripoint switch, used as a particular implementation of the sensor 20. In the event of a bubbler sensor fault or of the actual fluid level rising to a level too high for normal operation of the sensor 20, the "high alarm" signal is generated by the sensor 20 to cause the overall control system of the present invention to go into a maximum pumping configuration. When this signal is received, the controllers 26, 28 can start all the motors 8 (and thus their pumps) that are in the "auto" mode as set by the switches 30. The system will stay in this configuration until the level switch goes back to normal. At this time, the system will shut down and try to resume normal operation.

For the particular implementation of the sensor 20 by a bubbler system of a conventional type known in the art, such a bubbler system converts pressure of the fluid to a fluid level. In conjunction with such a bubbler system, the particular implementation of the present invention referred to herein uses two air compressors that are alternated to enhance the reliability of operation.

A second high alarm sensor is a float ball sensor, such as a Consolidated Electric 10250T101, embodying the maximum level sensor 22. The purpose of the float ball sensor is to provide protection against a main control failure or a failure of the bubbler sensor 20. Accordingly, this second level sensor 22 bypasses the main controllers 26, 28 and the bubbler sensor 20 and operates directly on the programmable logic controller module 36. When the programmable logic controller 36 receives the maximum level sensor signal from the sensor 22, all motors in the "auto" mode are automatically connected through the line contactors 16 to the full power signal of the primary power source 14. In a particular implementation 5-minute cycling of motors is used until the level goes below the maximum.

Variable speed drive failures are handled automatically in the system of FIG. 2 in response to sensing the "VFD Fault" signal shown in FIG. 2. This signal is provided from the drive unit 10 in known manner. In the event of such a failure, the controller 26 switches the system to across-the-line operation (i.e., all "auto" mode motors are connected through their respective line contactors 16 as needed in response to the monitored fluid level).

The system is also equipped with an input that monitors the status of the seal pumps. This is indicated by the "seal pump fail" signal shown in FIG. 2. In the event that a seal pump should fail to start when any pump 6 is running, the system will automatically start the second seal pump and sound an alarm. In the particular implementation, seal pumps for cooling the seals of the pumps 6 and the air compressors of the bubbler sensor 20 are alternated every time this system starts a lead pump. The system will alternate the seal pumps and air compressors every day at a fixed time in case the lead pump has not stopped during the preceding 24 hour period.

A reset signal is provided by an operator accessible pushbutton to reset the fault circuits and silence the alarm horn.

Other faults can also be sensed. Examples of these include 3-phase power monitoring (e.g., such as by a Time Mark model 259), faults in a level sensor (e.g., by a Robertson-Halpern 160C), and motor/pump overload (e.g., by using standard overload relays on the outputs of the line contactors 16; when this occurs in the particular implementation, the overloaded motor/pump is automatically taken out of the sequencing which occurs in the auto mode as subsequently described).

Other connections not shown in FIG. 2 can be implemented. For example, a direct connection to a RS-232 port on the controller 26 allows for the connection of a computer. This connection can be used to reprogram the controller or monitor and adjust the operational conditions of the system.

By way of another example, a high speed connection is built into the controller 26 to allow for remote connection of a computer to the system. The use of this connection requires a network card in the remote computer and a direct cable connection between the present invention and remote computer. This allows for remote control of the control system.

The system shown in FIG. 2 can be packaged in any suitable manner. As one example, the variable frequency drive unit 10, the switches 12, 16, the elements of the control means 18, and the line reactor 24 can be housed in one or more cabinets. Three have been used in a particular implementation. On an outside operating panel of this implementation, there are provided a water level gauge, a run time display, an alarm horn, a silence switch to deactivate the horn, a fault light, pump run lights, the HOA switches 30 and the inverter/bypass switch 32.

The operation of the system of FIG. 2 and the method of the present invention will be more particularly described with reference to the flow chart of FIGS. 3A and 3B, which flow chart can be converted into a computer program for programming the main controller 26 in a manner known in the art (such as by using C programming language), thereby providing programmed computer means, and individual means thereof, for implementing elements of the present invention. A specific implementation of a program for the controller 26 is listed in Appendix A of this disclosure; and a specific implementation of a program for the controller module 36 is shown in Appendix B of this disclosure.

It is noted generally that the controller 26 needs to be programmed so that it knows when to add or subtract a motor 8 to achieve the desired pumping command, and it also needs to know when to switch a motor 8 between the variable frequency drive unit 10 and the primary power source 14. In the preferred embodiment such "knowledge" is based on programming that defines at least one motor utilization criterion. Such a criterion can be that all motors are to be run an equal amount of time so that when all motors are stopped, the subsequent sequencing of motors is determined to equalize the run times (e.g., the motor which has been run the least during the prior run times is selected as the first, or lead, motor to be energized during the next sequence).

Examples of other motor utilization criteria include motor or pump characteristics (e.g., one motor larger than another), the physical location of a pump relative to the overall function to be achieved by the system, and maintaining operation of each motor within the most efficient part of its power curve.

Figure 3A:
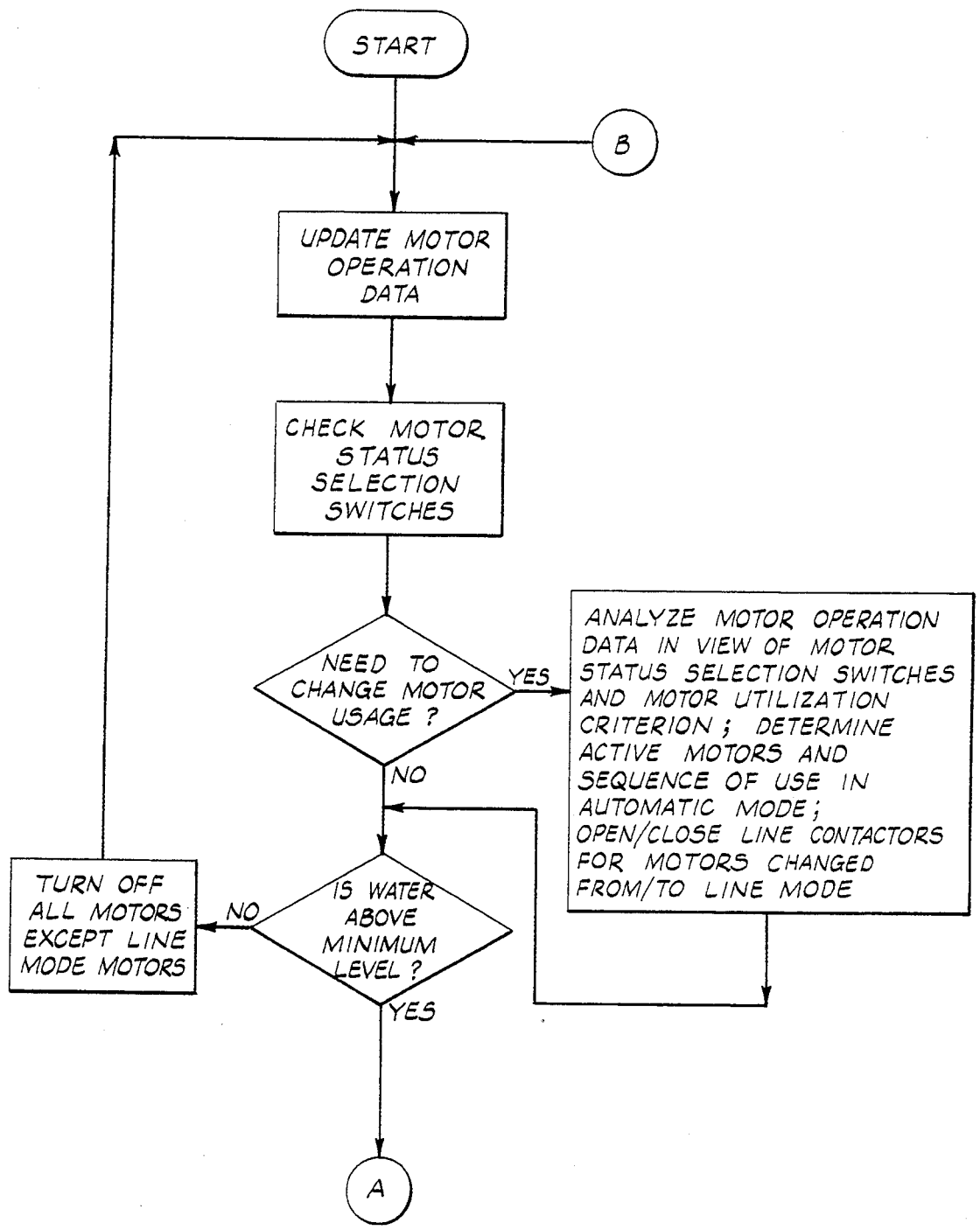
FIGS. 3A and 3B are a flow chart of a computer program for operating the system of the depicted preferred embodiment of the present invention.

Whatever the selected criterion is (or several criteria are), during each operation of the motors 8 the actual motor operation data correlated to the selected criterion are updated as shown at the beginning of FIG. 3A. Updating in the preferred embodiment includes determining the time that each motor 8 and corresponding pump 6 have been operated, and generating and storing in memory within the controller 26 encoded signals as data defining a history of operation of each motor and pump combination. This creates a historical database in the controller 26. This can be conventionally implemented by software timers and registers for each motor 8.

Continuing in FIG. 3A, the controller 26 is programmed to check the motor status selection switches 30, 32. In response to any change in the status of such switches, and other internally programmed factors as may be used, the controller 26 determines whether the current motor usage sequence needs to be changed.

If the motor usage sequence needs to be changed, the controller 26 analyzes the historical database of motor operation data in view of the motor status selection switches and the predetermined motor utilization criterion. The controller 26 determines which of the motors 8 have been selected as active, and the controller 26 determines the sequence of use of the active motors that have been placed in automatic mode via operation of the respective switches 30a, 30b, 30c. If by the latest operation of the motor status selection switches 30, 32, the status of one or more of the motors 8 has been changed, the controller 26 places the appropriate control signal on its respective output lines to open or close the line contactors 16 for the respective motors that have been so changed (they are opened if changed to "off" or "auto", and closed if changed to "line").

By way of an example, assume that the system has never operated. An operator then sets the switches 30a, 30b, 30c so that motor 8a is to run in the line mode and motors 8b, 8c are to run in the automatic mode. The controller 26 thus knows that motor 8a is to be connected directly to the primary power source 14 through line contactor 16a. The controller 26 also knows that it needs to determine the sequence of operation between the motors 8b, 8c. In the particular implementation, this is determined based on the criterion of whether motor 8b or motor 8c has been run longer. Since neither has been run at all within our example, the controller 26 uses a default with which it is programmed to allow it to make a choice between two motors of equal standing based on the particular utilization criterion. This might cause the controller 26 to set motor 8b as the first motor to be energized in automatic mode and the motor 8c to be the second one energized. Because this would cause the motor 8b to be run longer than the motor 8c during the time period from when the motor 8b is first started to when both motors are stopped, the next time the controller 26 made the analysis by comparing the historical time data for the two motors, motor 8c would then be the lead motor if all other factors were the same as before.

A further factor can be added so that if all the motors are never all stopped over a predetermined time period, the controller 26 still does an analysis and rotates the lead motor to equalize run time. For example, the controller 26 might be programmed to rotate the lead motor every day.

If a switch 30 is in the off position, that motor is bypassed and the next available motor is used by the controller 26.

The foregoing shows that the present invention can variably sequence the operation of the motors in response to the predetermined criterion (or multiple criteria if desired) and actual obtained and stored data that relate to the criterion.

Further in FIG. 3A, after the analysis has been made or if none is needed, the controller 26 is programmed to then determine whether the water level is above a minimum level. If it is not, the controller 26 makes sure that all the motors 8 (except those in line mode) are turned off so that the reservoir is not further drained (except by those in line mode) and the program returns to the beginning as indicated in FIG. 3A. The system does not operate with the fluid level below a predetermined set point unless the operator switches a motor to the hand, or line, mode of operation. Although not shown in FIG. 3, the "auto" mode pumps are also deactivated if the sensor 20 fails, unless the sensor 22 indicates the fluid level has reached the maximum, whereupon all the active pumps are energized.

Figure 3B:
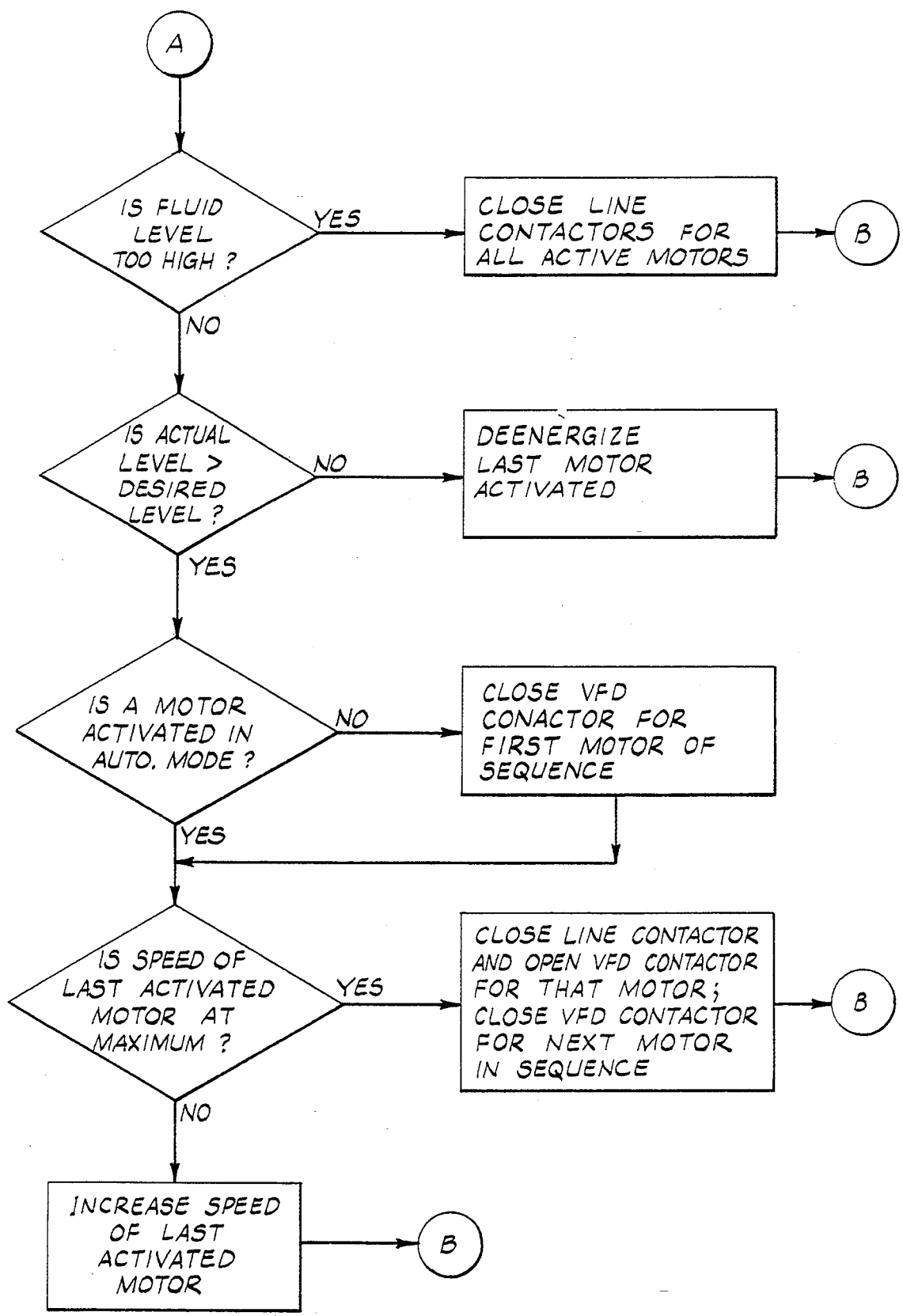

If the water is above the minimum level, the controller 26 determines whether the fluid level is too high (FIG. 3B). This can be determined by sensing the high alarm signal through the controller 28. If this condition occurs, the controller 26 closes the line contactor 16 for all motors other than those that have been designated inactive via the respective switch 30. Alternatively, if the fluid level is too high as indicated by the maximum level sensor 22, the programmable logic controller 36 can on its own cause all of the active motors to be switched to the primary power source 14 through the respective line contactors 16. These events typically occur only when the main level sensor 20 or the controller 26 fails.

If the system is operating within the normal range between the minimum and maximum levels, FIG. 3B further shows that the controller 26 determines, via the signal from the main level sensor 20, whether the actual fluid level is greater than a desired fluid level either programmed in the controller 26 or determined by the setting of the sensor 20. If it is not greater, the controller 26 de-energizes the last motor activated then returns to the beginning of the program as indicated in FIGS. 3A and 3B. De-energizing the last motor activated includes switching the last motor of the sequence from the primary power source 14 by opening the respective line contactor 16 and connecting the respective motor to the variable frequency drive unit 10 through the respective VFD contactor 12. In the preferred embodiment, this is done without stopping the respective motor. Thereafter, the motor is slowed down until it is stopped via operation of the connected variable frequency drive unit 10 responding to the speed control signal from the controller 26. This is repeated, one motor at a time, by the controller 26 until no motors are energized if the actual level continues to not exceed the desired level.

If the actual level does exceed the desired level, FIG. 3B shows that the controller 26 first determines whether a motor that has been placed in automatic mode is activated. If one is not, the controller 26 closes the VFD contactor 12 for the first motor of the previously determined sequence. The controller 26 then continues by determining whether the speed of the last activated motor is at a maximum. If it is at a maximum, the controller 26 then switches that motor to line operation by closing the respective line contactor 16 and opening the respective VFD contactor 12 for that motor. The controller 26 then closes the VFD contactor 12 for the next motor in the sequence. The controller 26 returns to the beginning of the program illustrated in FIGS. 3A and 3B so that this continues until enough motors have been brought on line to cause enough pumps to pump out enough fluid to return the fluid level to the desired level. In a particular implementation, maximum motor speed is determined by whether a particular motor is at 100% of its speed for five minutes while being driven by the variable frequency drive unit 10.

If the last activated motor is not at maximum speed, the controller 26 increases the speed of that motor and returns to the beginning as indicated in FIG. 3B.

During any aforementioned switching of any motor 8 between the variable frequency drive unit 10 and the primary power source 14 and vice versa, such switching is to be accomplished with no break in motor operation. For the particular application with the pumps 6, this reduces the possibility of check valve and hydraulic shock damage.

From the foregoing, it is apparent that the present invention is also responsive to a sensed parameter affected by the number of motors that are operating. In the described embodiment, this parameter is the fluid level in the reservoir 2.

It is also apparent from the foregoing that at any one time at most one of the first plurality of switches 12 is operated in response to the programmed motor controller 26 through the connecting means that includes the programmed logic controller 36 to operatively connect the variable speed drive 10 to the respective motor 8 connected to that one switch 12. Additionally, at such any one time at most all of the second plurality of switches 16 are operated in response to the programmed motor controller 26 through the connecting means to operatively connect the primary power source 14 to the respective motors 8.

To reiterate and further illustrate the foregoing, consider the control system and method of the present invention as designed to hold the fluid level for a municipal water lift station at a preset level with the following specific parameters:

Wetwell Setpoint: 25.0 inches
Wetwell Low Limit: 15.0 inches
Wetwell High Limit: 45.0 inches
Variable Speed Drive Cutoff: 30.0 hz
DEMAND ON Timing: 60 hz/5 min.
DEMAND OFF Timing: 45 hz/2 min.
Number of Stages: 3

The system operates at the minimum speed necessary to maintain the wetwell setpoint. As the well level drops below the setpoint, the variable speed drive unit 10 reduces the speed of the respective motor it is driving until one of two conditions is satisfied. Either the wetwell level rises back to the setpoint or the speed of the motor drops below cutoff. If the wetwell level rises, the variable drive maintains the setpoint. If the wetwell level continues to fall, the variable speed drive unit shuts down when the speed of the motor falls below 30 hertz. This is done to prevent unnecessary heating of the motor while operating on a very uneconomical portion of the pump curve.

As the wetwell level continues to rise (assume a single pump is running), the variable speed drive unit 10 is commanded to increase the speed of the one motor it is driving. Referring to the system illustrated in FIG. 2 and assuming all three switches 30a, 30b, 30c are in the "auto" position, when the variable speed drive applies power to cause the motor to reach a maximum speed of 60 hertz (for example) and maintains this speed for more than 5 minutes (for example), stage two pumping is initiated by switching the first motor to the primary power source 14 and switching the second motor to the variable frequency drive unit 10. If the speed should fall from maximum at any time during this five minute period, the software "DEMAND ON" timer will be restarted (i.e., switching to line will not occur until a continuous five minute period at maximum speed has elapsed).

If the system is operating in the aforementioned stage two, one of the following conditions exists: (1) the inflowing fluid has increased the fluid level in the reservoir 2 to the point where one pump cannot maintain the level or (2) the stage one pump is inoperative for some reason. If the variable speed drive is operational, in stage two pumping the lead motor operates across the line and the second motor operates from the variable speed drive. If the variable speed drive unit 10 is in a failed mode, the stage one and stage two motors both are operating across the line if needed and a fault is displayed on the variable speed drive 10.

If the stage one and stage two pumps are unable to prevent the level from continuing to rise, then stage three pumping begins. Stage three pumping operates exactly like stage two except that both the first and second motors operate across the line and the third motor operates from the variable speed drive 10.

In normal operation, the motors continue to run either across the line or from the variable speed drive until one of two conditions is met: (1) the variable speed drive is either commanded to decrease speed to approximately 45 hertz or (2) the wetwell level drops below the low-limit cutoff point.

If the variable speed drive unit drops below 45 hertz for two minutes (as determined by the DEMAND OFF timing shown in the above table, which timing is encoded within the programming), the controller 26 shuts down the highest pumping stage that is operating assuming that more than one pump is pumping. The controller 26 switches the variable speed drive to a motor previously operating across the line and begins variable speed operation with that motor.

If the wetwell level drops below the low-limit setpoint, the controller 26 shuts all "auto" mode pumps down immediately.

Although not shown in the program of FIG. 3, the fault conditions are also accommodated. This can be readily implemented in a conventional manner as readily apparent from the foregoing description from the particular faults referred to hereinabove. For example, if the variable speed drive unit should fail, it generates a fault signal which is sent through the controller 28 to cause the controller 26 to automatically switch all active motors to line operation as needed.

Thus, the present invention is well adapted to carry out the objects and attain the ends and advantages mentioned above as well as those inherent therein. While preferred embodiments of the invention have been described for the purpose of this disclosure, changes in the construction and arrangement of parts and the performance of steps can be made by those skilled in the art, which changes are encompassed within the spirit of this invention as defined by the appended claims.

What is claimed is:

1. A control system for a plurality of motors, comprising:
   one, and only one, motor drive means for providing power to drive any one of the motors;
   control means for automatically controlling which of the motors to energize;
   first means for communicating the power from said motor drive means to one of the motors selected by said control means; and
   second means, adapted for connecting to a primary power source, for communicating power from the primary power source to one or more of the motors selected by said control means;
   wherein at any one time at most one of the motors is operated in response to said control means through said first means to operatively connect said motor drive means to the respective motor and at said any one time at most all of the motors are operated in response to said control means through said second means to operatively connect the primary power source to the respective motors.

2. A control system as defined in claim 1, wherein said control means includes means for variably sequencing the motors to which said first means communicates power from said motor drive means.

3. A control system as defined in claim 1, wherein said control means includes means for operating said first means and said second means so that a motor selected by said control means is switched between said first means and said second means without the selected motor stopping.

4. A control system as defined in claim 1, wherein said motor drive means includes a variable speed motor drive unit.

5. A control system as defined in claim 4, wherein said variable speed motor drive unit provides a variable frequency electrical signal to said first means.

6. A control system as defined in claim 1, wherein said control means includes means for independently selectably operating each of the motors in one of three modes, including one mode wherein a motor so operated is normally initially energized through said first means and subsequently through said second means, another mode wherein a motor so operated is normally initially energized only through said second means, and a further mode wherein a motor so selected is not operated.

7. A control system as defined in claim 1, wherein said control means includes means for generating and storing data defining a respective history of operation for each of the motors.

8. A control system for a plurality of motors, comprising:

one variable speed drive for energizing a motor to run at different speeds;

a programmed motor controller;

a first plurality of switches, each of said first plurality of switches connected to said variable speed drive and to a respective motor;

a second plurality of switches, each of said second plurality of switches connected to a primary power source and to a respective motor; and connecting means for connecting said programmed motor controller to said first and second pluralities of switches;

wherein at any one time at most one of said first plurality of switches is operated in response to said programmed motor controller through said connecting means to operatively connect said variable speed drive to the respective motor and at said any one time at most all of said second plurality of switches are operated in response to said programmed motor controller through said connecting means to operatively connect the primary power source to the respective motors.

9. A control system as defined in claim 8, wherein said motor controller is programmed for recording data defining the operation of each motor and for determining which motor to select in response to the recorded data and at least one predetermined motor utilization criterion.

10. A control system as defined in claim 8, wherein said motor controller is programmed for controlling said first and second pluralities of switches so that in a first mode a selected motor is energized first through a respective one of said first switches and then through a respective one of said second switches and in a second mode a selected motor is energized only through a respective one of said second switches.

11. A control system as defined in claim 8, further comprising a third plurality of switches, each of said third plurality of switches connected to said programmed motor controller and each of said third plurality of switches switchable to one of three positions to define whether a respective motor is to be energized through one of said first plurality of switches, or whether the respective motor is to be energized only through a respective one of said second plurality of switches or whether the respective motor is not to be energized.

12. A control system as defined in claim 8, wherein said connecting means includes a programmed logic controller having a plurality of inputs connected to said programmed motor controller and having a plurality of outputs connected to said first plurality of switches and said second plurality of switches.

13. A pumping system, comprising:

a plurality of pumps;

a plurality of pump motors, each of said motors connected to a respective one of said pumps;

motor drive means for providing power to energize any one of said motors;

control means for controlling which of said motors to energize;

first means, responsive to said control means, for communicating the power from said motor drive means to one of said motors selected by said control means; and second means, adapted for connecting to a primary power source and responsive to said control means, for communicating power from the primary power source to one or more of said motors selected by said control means;

wherein at any one time when pumping is to occur said first means is operated in response to said control means to operatively connect said motor drive means to at most one of said motors and at said any one time said second means is operated in response to said control means to operatively connect the primary power source to at most all said motors.

14. A pumping system as defined in claim 13, wherein said control means includes computer means for recording data defining the operation of each motor and for determining which motor to select in response to the recorded data and at least one predetermined motor utilization criterion.

15. A pumping system as defined in claim 13, wherein said control means includes computer means for controlling said first and second means so that a selected motor is energized either first through said first means and then through said second means or first through said second means.

16. A pumping system as defined in claim 13, wherein said control means includes a programmed motor controller and a programmed logic controller having a plurality of inputs connected to said programmed motor controller and having a plurality of outputs connected to said first means and said second means.

17. A pumping system as defined in claim 16, wherein:

said first means includes a first plurality of contactors connected to respective outputs of said programmed logic controller, each of said contactors of said first plurality providing means for communicating three-phase electrical power from said motor drive means to a respective motor; and said second means includes a second plurality of contactors connected to respective outputs of said programmed logic controller, each of said contactors of said second plurality providing means for communicating three-phase electrical power from the primary power source to a respective motor.

18. A pumping system as defined in claim 17, further comprising a plurality of switches, each of said plurality of switches connected to said programmed motor controller and each of said plurality of switches switchable to one of three positions to define whether a respective motor is to be energized through said first plurality of contactors, or whether the respective motor is to be energized only through said second plurality of contactors or whether the respective motor is not to be energized.

19. A pumping system as defined in claim 18, wherein said motor drive means includes a variable speed motor drive unit providing variable frequency three-phase electrical power to said first plurality of contactors.

20. A pumping system as defined in claim 18, wherein said programmed motor controller includes means for variably sequencing the motors to which said first means communicates power from said motor drive means.

21. A pumping system as defined in claim 13, wherein said control means includes means for operating said first means and said second means so that a motor selected by said control means is switched between said first means and said second means without the selected motor stopping.

22. A pumping system as defined in claim 13, wherein said control means includes means for generating and storing data defining a respective history of operation for each of the motors.

23. A control system for a plurality of motors, comprising:
one, and only one, variable speed motor drive means responsive to an external control signal for providing selectable power to drive any one of a plurality of motors;
automatic control means for automatically controlling which of the motors to energize and for automatically generating the external control signal for selecting the power to be provided by said variable speed motor drive means to selectably increase or decrease the speed of one of the motors selected by said automatic control means;
first means, responsive to said automatic control means, for communicating the selected power from said variable speed motor drive means to said one of the motors selected by said control means; and
second means, responsive to said automatic control means and adapted for connecting to a primary power source, for communicating power from the primary power source to one or more of the motors selected by said control means;
wherein at any one time at most one of the motors is operated in response to said automatic control means through said first means to operatively connect said motor drive means to the respective motor and at said any one time at most all of the motors are operated in response to said automatic control means through said second means to operatively connect the primary power source to the respective motors.

24. A control system as defined in claim 23, wherein said automatic control means includes means for operating said first means and said second means so that a motor selected by said automatic control means is automatically switched between said first means and said second means without the selected motor stopping.

25. A control system as defined in claim 23, wherein said automatic control means includes means for generating and storing data defining a respective history of operation for each of the motors.

26. A control system as defined in claim 23, wherein said automatic control means is programmed for recording data defining the operation of each motor and for determining which motor to select in response to the recorded data and at least one predetermined motor utilization criterion.

27. A control system for a plurality of motors, comprising:
one variable speed drive for energizing a motor to run at different selectable speeds which can be selectably increased of decreased;
a programmed motor control computer having an output connected to said variable speed drive, said computer programmed for generating a speed control signal for said variable speed drive regardless of which one of a plurality of motors is connected to said variable speed drive and for providing the speed control signal through said output to said variable speed drive, and said computer programmed for generating switch control signals and for providing the switch control signals through additional outputs of said computer;
a first plurality of switches, each of said first plurality of switches connected to said variable speed drive and adapted for connecting to a respective motor;
a second plurality of switches, each of said second plurality of switches adapted for connecting to a primary power source and to a respective motor; and
switch operating means for operating said switches sequentially in response to said switch control signals from said programmed motor control computer;
wherein at any one time at most one of said first plurality of switches is operated in response to said programmed motor control computer through said switch operating means to operatively connect said variable speed drive to the respective motor and at said any one time at most all of said second plurality of switches are operated in response to said programmed motor control computer through said switch operating means to operatively connect the primary power source to the respective motors.

28. A control system as defined in claim 27, wherein said motor control computer is further programmed for recording data defining the operation of each motor and for determining which motor to select in response to the recorded data and at least one predetermined motor utilization criterion.

29. A control system as defined in claim 27, wherein said switch operating means includes a programmed logic controller having a plurality of inputs connected to said programmed motor control computer and having a plurality of outputs connected to said first plurality of switches and said second plurality of switches.

30. A control system for a plurality of motors, comprising:
one variable speed motor drive unit responsive to a speed control signal to provide a motor drive signal which can maintain, increase or decrease speed of a motor operatively connected to said motor drive unit;
a first plurality of at least three switch contactors, each connected to said one variable speed motor drive unit and adapted to connect to a respective one of the at least three motors;
a second plurality of at least three switch contactors, each adapted to connect to a respective one of the at least three motors and to a primary power source;
a programmed controller having a speed control output connected to said variable speed motor drive unit to provide the control signal thereto wherein the control signal causes said one variable speed motor drive unit to generate the motor drive signal to maintain, increase or decrease the speed of one of the motors selectably operatively connected thereto through a selected one of said first plurality of switch contactors, said controller further having a plurality of contactor control outputs through which contactor control signals are provided so that at most one of the motors is energized from said one variable speed motor drive unit through said first plurality of switch contactors at one time and so that at most all the motors are energized at one time from the primary power source through said second plurality of switch contactors in response to the contactor control signals;
a plurality of relays, each of said relays connected to a respective one of said contactor control outputs and each of said relays providing means for communicating a higher voltage actuating signal in response to a lower voltage contactor control signal from the respective contactor control output; and a programmable logic controller, connected to said relays and said first and second pluralities of switch contactors, for providing contactor switch timing in communicating each said actuating signal to a respective one of said switch contactors.

31. A control system as defined in claim 30, wherein said programmed controller operates said variable speed motor drive unit and provides contactor control signals for controlling said first and second pluralities of switch contactors through said relays and said programmable logic controller so that a motor selected by said programmed controller is automatically switched between a switch contactor of said first plurality and a switch contactor of said second plurality without the selected motor stopping.

32. A control system as defined in claim 30, wherein said programmed controller is programmed for recording data defining the operation of each motor and for determining which motor to select for operation in response to the recorded data and at least one predetermined motor utilization criterion.

* * * * *

UNITED STATES PATENT AND TRADEMARK OFFICE
CERTIFICATE OF CORRECTION

Patent No.: 5,422,550

Dated: June 6, 1995

Inventor(s): Michael L. McClanahan and Charles E. Ogden

It is certified that errors appear in the above-identified patent and that said Letters Patent are hereby corrected as shown below:

```
Column 3, line 61, after "means" delete ":".
```

Signed and Sealed this

Twenty-sixth Day of September, 1995

Attest:

BRUCE LEHMAN

Attesting Officer  Commissioner of Patents and Trademarks

UNITED STATES PATENT AND TRADEMARK OFFICE
CERTIFICATE OF CORRECTION

PATENT NO. : 5,422,550
DATED : June 6, 1995
INVENTOR(S) : Michael L. McClanahan and Charles E. Ogden It is certified that error appears in the above-indentified patent and that said Letters Patent is hereby corrected as shown below:

Column 3, line 61, after "means" delete ":".

Column 16, line 56, change "18" to --16 --.

This certificate supersedes Certificate of Correction issued September 26, 1995.

Signed and Sealed this

Fifth Day of March, 1996

Attest:

BRUCE LEHMAN

Attesting Officer

Commissioner of Patents and Trademarks